(12) United States Patent
Martin (10) Patent No.: US 8,905,280 B2
(45) Date of Patent: Dec. 9, 2014

(54) OPEN SIDE WALL MOUNT RACK

(71) Applicant: Marquette Mounts, Marquette, MI (US)

(72) Inventor: Robert Martin, Marquette, MI (US)

(*) Notice: Subject to any disclaimer, the term of this patent is extended or adjusted under 35 U.S.C. 154(b) by 229 days.

(21) Appl. No.: 13/624,157

(22) Filed: Sep. 21, 2012

(65) Prior Publication Data

US 2013/0075436 A1    Mar. 28, 2013

Related U.S. Application Data

(60) Provisional application No. 61/537,688, filed on Sep. 22, 2011.

(51) Int. Cl.
*B60R 9/00*     (2006.01)

(52) U.S. Cl.
CPC .......................... *B60R 9/00* (2013.01)
USPC ................................ 224/405; 224/544; 293/3

(58) Field of Classification Search
CPC ................................... B60R 9/00; B60R 9/02
USPC ......... 224/400, 402, 405, 544, 519, 319, 322; 280/506; 296/3
See application file for complete search history.

(56) References Cited

U.S. PATENT DOCUMENTS

| | | | |
|---|---|---|---|
| 2,947,566 A | 8/1960 | Tower | |
| 3,594,035 A | 7/1971 | Ferguson | |
| 3,623,690 A * | 11/1971 | Bargman, Jr. | 410/116 |
| 3,765,713 A | 10/1973 | Suitt | |
| 4,138,046 A | 2/1979 | DeFreze | |
| 4,152,020 A | 5/1979 | Brown et al. | |
| 4,444,427 A * | 4/1984 | Martin | 296/43 |
| 4,509,787 A | 4/1985 | Knaack et al. | |
| 5,611,472 A * | 3/1997 | Miller | 224/403 |
| 5,699,945 A | 12/1997 | Micklish | |
| 5,915,900 A * | 6/1999 | Boltz | 410/110 |
| 6,421,726 B1 * | 7/2002 | Kenner et al. | 709/225 |
| 6,592,162 B2 * | 7/2003 | Felix et al. | 296/3 |
| 6,679,408 B1 * | 1/2004 | Thomas et al. | 224/403 |
| 7,014,236 B2 | 3/2006 | Kerns | |
| 7,114,896 B2 * | 10/2006 | Lantrip | 410/7 |
| 7,296,837 B2 | 11/2007 | Niedziela et al. | |
| 7,753,425 B2 | 7/2010 | Niedziela et al. | |
| 7,757,916 B1 | 7/2010 | Petrie et al. | |
| D624,005 S | 9/2010 | Winner et al. | |
| D638,773 S | 5/2011 | Laverack et al. | |
| 2011/0108590 A1 | 5/2011 | Kennedy et al. | |
| 2011/0266322 A1 | 11/2011 | Jones | |

OTHER PUBLICATIONS

Bully CG-901 Bully Adjustable Side Mount Ladder Rack, www.jegs.com/i/Bully/684/CG-901/10002/-I , last accessed Oct. 8, 2012.

(Continued)

*Primary Examiner* — Justin Larson
(74) *Attorney, Agent, or Firm* — Device Patent LLC (57) ABSTRACT

The present teaching are related to an article comprising: a.) a horizontal rail capable of bearing loads; b.) affixed to the horizontal rail are two or more vertical support rails wherein the distance between the vertical support rails may be varied; c.) affixed to the horizontal rail are two or more carrying rails wherein the carrying rails are capable of carrying a load wherein the carrying rails may be moved to multiple positions; wherein the horizontal rail may be affixed to the vertical support rails and the carrying rails are affixed to the horizontal rail, and the vertical support rails are adapted to be affixed to a side wall of the bed of a pick-up truck.

20 Claims, 4 Drawing Sheets

(56) References Cited

OTHER PUBLICATIONS

DeeZee Half Ladder Rack—DZ95053, www.deezee.com/products/197/Truck_Bed_Accessories/Ladder_Racks/Half_ladder_rack.html, last accessed Oct. 8, 2012.

Easy Loader Ladder Truck Rack, http://www.usrack.com/easy_loader_ladder_rack.php, last accessed Oct. 15, 2012.

Side-Mount Ladder Truck Rack, http://www.usrack.com/side_mount_ladder_rack.php, last accessed Oct. 15, 2012.

T-Bar Kayak Rack, http://www.usrack.com/t_bar_rack.php, last accessed Oct. 15, 2012.

US Rack Side Mount Roller Rack 2007-3 www.realtruck.com/us-rack-side-mount-roller-ladder-racks/2007-3.html, last accessed Nov. 15, 2012.

Weatherguard Weekender Ladder Rack, http://www.weatherguard.com/pdfs/uploaded/24-0192.pdf, Last accessed Oct. 15, 2012.

* cited by examiner

OPEN SIDE WALL MOUNT RACK

FIELD OF THE INVENTION

The present teaching relates to a rack that can be mounted on the side of an open bed vehicle, such as a truck for holding cargo.

BACKGROUND OF THE INVENTION

Pickup trucks are popular for use in a myriad of ways due to their versatility and ability to carry loads and objects. Racks for use with pickup trucks enhance the ability of the trucks to carry objects, for instance objects that are longer than the bed of the truck. Common racks are disposed over the entire bed and are often custom built to fit the truck. Such racks can otherwise limit the use of the truck bed, make the use of a cover on the bed such as a tonneau cover impractical or impossible, exposing the contents of the bed to the outside elements. The rack also requires a significant amount of time to mount and remove from the truck. Further the mounting of such systems can damage the bed or require that permanent holes be placed in the bed. Further such systems can be quite expensive to install.

There are a number of pickup truck manufacturers; each one utilizes differences in the design of the beds. Some pickup truck manufacturers provide a number of bed length options. Some beds have pocket or stake holes and some do not. Some provide tie down rings. The design of the beds can vary for a variety of other reasons, both functional and cosmetic. Additionally different objects that users desire to carry in their pickup trucks require different mounting methods.

For users of pickup trucks who utilize their trucks in a variety of ways the use of such racks is prevented due to the concerns listed above. Many of these users desire a system that can be easily mounted on the bed, does not significantly restrict the use of bed while the rack is in use and still allows the use of the bed cover. Such users also desire a rack that can be adapted to carry a variety of different objects. There are a number of aftermarket carriers for use with trucks that are available for carrying different objects, for instance utility carriers, ski carriers, ski racks, bike racks, tool carriers, and the like. Many truck owners desire racks that can hold and support such carriers.

Thus what is needed is a rack system that can be utilized on a variety of different trucks with different bed designs and lengths, to carry a variety of objects and can be adjusted to carry different objects at different times on the same truck and rack. What is further needed is a rack system that does not restrict the use of the bulk of the bed. What is needed is a rack system that while in use does not interfere with the use of a truck bed cover such as a tonneau. What is needed is a rack system that can be quickly mounted and removed and can be utilized with a variety of commercially available carriers.

SUMMARY OF THE INVENTION

The present teaching address one or more of the above needs by providing an article comprising: a.) a horizontal rail capable of bearing loads; b.) affixed to the horizontal rail are two or more vertical support rails wherein the distance between the vertical support rails may be varied; c.) affixed to the horizontal rail are two or more carrying rails which are disposed in a horizontal orientation and perpendicular to the direction of the horizontal load bearing rail wherein the carrying rails are capable of carrying a load wherein the carrying rails may be moved to multiple positions; wherein the horizontal rail may be affixed to the vertical support rails and the carrying rails are affixed to the horizontal rail, and the vertical support rails are adapted to be affixed to a side wall of the bed of a pick-up truck. Preferably, two or more support rails are attached to pocket hole inserts capable of supporting the weight of the article and any load placed on the carrying rails. Preferably, the horizontal rail comprises a smaller rail nested within larger rail such that the length of the horizontal rail can be varied and the support rails are affixed to the horizontal rail such that when the length of the horizontal rail may be varied, the distance between the support rails may be varied. Preferably, the support rails have openings through which the horizontal rail may be disposed and the distance between the support rails may be adjusted by sliding the support rails along the horizontal rail and the support rails may be affixed such that once the distance between the support rails has been selected the distance is maintained. Preferably, the carrying rails are attached to the horizontal rail using sliding attachment mechanisms which allow the carrying rails to be held in a desired location. Preferably, the horizontal rail has a plurality of openings that the carrying rails can be placed through to adjust the location of the carrying rails. The rack can be affixed to a pick up bed side wall by affixing it to rails on the side wall or by affixing it to the inside of the pickup bed using known fixturing techniques. In a preferred embodiment, the pocket hole insert has a wedge assembly, with a shim running along two opposing sides of the wedge assembly beginning at the rim base of the hollow post to below the wedge assembly.

In another embodiment, the invention is an article comprising a horizontal rail wherein a smaller tube nests within a larger tube creating a telescoping rail, wherein one or more support rails are attached perpendicularly to the smaller tube, one or more support rails are attached perpendicularly to the larger tube, one or more rail mounting brackets are attached in parallel on an upper side of the smaller tube, one or more rail mounting brackets are attached in parallel on the upper side of the larger tube; the support rails have a hollow post extending downward from the horizontal rail, into a pocket hole insert, wherein a mounting bolt head rests on a base of the hollow post while a mounting bolt body extends through a hole in a rim base of the hollow post continuing through the pocket hole insert; the rail mounting brackets have a bracket, with one or more tube receivers secured perpendicularly on top of the bracket, a carrying rail may be disposed in the tube receiver; wherein the article may be adapted to be secured to a side of a truck to secure one or more objects in line with the side of the truck.

The articles of the invention can be utilized for a variety of trucks with different designs, different bed lengths and the like. The articles can be quickly mounted and removed from the truck beds and can be adjusted for different objects as desired by the user. For a number of trucks the articles can be mounted without permanently damaging the truck, for instance the body. The articles of the invention can be used with a number of commercially available carriers and can be adjusted to work with different commercially available carriers. The article of the invention allows for the use of a cover, such as a tonneau cover, without requiring the one or more carriers and/or cargo, or the actual rack to be removed.

DETAILED DESCRIPTION

U.S. Provisional Application Ser. No. 61/537,688 (filed Sep. 22, 2011) is hereby incorporated by reference along with any continuations thereof. The explanations and illustrations presented herein are intended to acquaint others skilled in the art with the invention, its principles, and its practical application. The specific embodiments of the present invention as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The article of the invention can be used with any vehicle having open rear sides, that is open to the air and has sides on the rear that can be utilized to mount the rack, for instance a pickup truck, a stake truck, an SUV with an open bed and the like. The rack may be disposed on one of the sides of the vehicle running front to back and can be referred to as a half rack. The rack for many of the vehicles can be reversed in the sense that either end can be placed toward the front of the vehicle.

The rack comprises a horizontal rail capable of bearing loads. This rail functions to support objects supported on and carried by the article of the invention. The rail further functions to support carrying rails and to facilitate adjustment of the location of the support rails and the carrying rails. The horizontal rail can be in any configuration that facilitates these functions. The horizontal rail may be a unitary rail or comprise two or more rails that fit together and perform the recited function. The horizontal rail preferably has sufficient strength to support the loads of the objects to be carried on the rack. Preferably the horizontal rail can withstand a load of 150 pounds or greater, more preferably 200 pounds or greater and up to about 600 pounds. The horizontal rail can be prepared from any material that performs the recited function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. In one embodiment of the rack, the horizontal rail may be formed by two or more halves of a rail of equal length that when secured as a unit by an end cap form a unitary rail. In an embodiment of the horizontal rail the top of the rail may be open. In a further embodiment of the horizontal rail the rail has either an internal or external track capable of moving and securing a load. In another embodiment the horizontal rail may contain two or more holes running perpendicularly from one side of the horizontal rail to the other.

The articles of the invention comprise two or more support rails adjustably attached to the horizontal load bearing rail. Adjustably attached means that the distance between the two or more support rails can be varied to fit the vehicle. In one embodiment the horizontal rail may be formed by two or more rails at least one support rail may be placed inside the outer most horizontal rail, where the movement of inner most horizontal rail in and out of the outer most horizontal rail adjusts the distance between the two supports. In another embodiment the two or more support rails may be connected to an internal or external track of the horizontal rail on which the support rail may be adjusted to the appropriate location. In a further embodiment of the support rails, the upper end of the support rails may contain a hole which runs through the entire support rail in order to accept the horizontal rail. Once the correct distance on a vehicle is determined the support rail may be adjusted. Additionally when an adjustment is made and the support rails are secured, movement of the horizontal rail may be prevented. The method of preventing movement of the two rails with respect to one another can be any known to the skilled artisan. The support rails further function to support the load on the horizontal rail and to prevent the rack from moving in a significant manner in any direction. Preferably the support rails hold the rack perpendicular to the plane of the bed of the truck. The support rails are in contact with devices used to affix the rack to the side of the bed. Where the rack may be attached to the vehicle using pocket holes, the support rails are contacted with pocket hole inserts such that the support rails can perform their function. In some embodiments the pocket hole insert contains receivers in which the support rails are placed. Such receivers preferably contain channels that the bottom end of the support rails are placed in. The length, shape and size of the channel must be such that the support rails are capable of supporting the rack as described herein. The support rail may be affixed to the pocket hole inserts using any known affixing method known to one skilled in the art, for examples bolts, inference fit, set screws, adhesives, snap fits, and the like. The support rails may be fabricated from any materials which allow them to perform their function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the support rails. The support rails and the horizontal rails may be fabricated from the same or different materials. The support rails must be capable of supporting the same loads as the horizontal rail. The support rails may be capable of receiving a fixed carrying rail which sits above the plane of the horizontal rail. In some embodiments the support rails may be hollow tubes. In one embodiment of the invention a mounting bolt is located within the support rail so that the head of the bolt rests on the inside bottom of a hollow support rail, allowing the bolt to pass through into a pocket hole insert. In some embodiments of the invention where the top of the support rail is open a cap may be placed on top of the opening.

The horizontal rail of the article further comprises two or more carrying rails. The carrying rails are disposed on the horizontal rails and function to hold the load on the rack. Preferably the carrying rails are disposed in a vertical plane parallel to the bed and are perpendicular to the direction of the horizontal rail. The carrying rails preferably can be moved to adjust the distance between the carrying rails to adapt to supporting a variety of load carrying systems. The number of carrying rails can be adjusted to fit the needs of the user and the load carrying system. The number may be 2 or greater. The upper number can be any amount needed for the user needs and the load carrying system, and are preferably 6 or less and more preferably 4 or less. The system of the invention can be adapted to allow additional carrying rails at any time. The method of affixing the carrying rails to the horizontal rail can provide for a set number of locations or can provide that the carrying rails can be located in any position along the horizontal load bearing rail. Preferably the carrying rails can be moved transversely with respect to the horizontal load bearing rail to facilitate adjusting them to the needs of the user and the load carrying system used with the rack. The transverse movement can be to set locations or allow the carrying rail to be in any location with respect to the horizontal rail. Once the locations along the horizontal rail and in the transverse direction are selected, the carrying rails may be affixed in place in a reversible manner to prevent movement. The carrying rails may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the carrying rails. The carrying rails and the horizontal rails may be fabricated from the same or different materials. The carrying rails must be capable of supporting the same loads as the horizontal rail. In one embodiment of the invention the carrying rails are attached to the horizontal rail by a carrying rail mounting bracket that is secured to the horizontal rail by any means that allows the rail mounting bracket to move along the horizontal rail to a desired position before being secured, by any means known in the art for example a bolt and nut, a set screw, a snap fit, and the like. The carrying rail mounting bracket may comprise tube receivers that may be adjustable in height and position along the carrying rail mounting bracket. The carrying rail may be positioned in a horizontal or vertical direction when attached to the horizontal load bearing rail. The location of the carrying rails the carrying rail mounting brackets and the tube receivers can be fixed by any known means in the art including bolts and nuts, set screws, snap fits, adhesives and the like. The horizontal load bearing rail may contain a number of holes passing transversely through the rail for holding carrying rails in place and allowing for adjustment of the location and distance between carrying rails to fixed locations. Such holes facilitate location of the carrying rails perpendicular to the horizontal load bearing rail and adjustment of the carrying rails in the transverse direction of the horizontal load bearing rails so as to adjust them for different carrying systems.

The system may further comprise a system for attaching the support rails to the vehicle, preferably to the side of the bed. Alternatively if the bed is a flat bed the support rails can be attached to any fixturing area provided for on the flat bed. The support rails may be contacted with pocket hole inserts and the inserts can be placed in the pocket holes of the bed sides. The support rails can be affixed to the bed side wall utilizing any fixturing system. For instance, the support rails can be welded or bolted to the side walls. Channels can be affixed to the side walls and the support rails or pocket hole inserts can be disposed in the channels. The support rails could be welded to the bed side walls although this limits the ability to easily remove the rack or use a cover with the rack.

In a preferred embodiment the article further comprises pocket hole inserts which are adapted to support the rack and hold it in place. The pocket hole inserts function to transfer the load to the body of the vehicle, hold the rack in place, preferably hold it perpendicular to the bed plane, prevent the rack from moving during use and prevent damage to the body of the vehicle (bed side wall). The pocket hole inserts preferably comprise a receiver for the support rails which functions to hold the support rails in place and provide the necessary rigidity, load bearing support and stability. The support rail may be affixed to the receiver in any known manner, screws and bolts, set screws, adhesives, interference fit, snap fits and the like. The pocket insert further comprises support legs that function to sit on the bottom of the pocket hole and to hold the other elements of the pocket hole in place and to prevent such parts from damaging the vehicle body. For instance the legs may be sufficiently long enough to hold other parts of the pocket hole insert above the bed side wall to prevent them from damaging the body. The pocket hole insert may comprise shims for filling the space between the legs and the inside walls of the pocket hole to enhance the stability and in some embodiments create and interference fit. The shims can be adjusted in shape to fit a particular vehicle and may be a polymeric material, elastomeric material or metal as described herein. The pocket hole insert may further comprise in intermediate structure that holds the support leg receiver to the legs. Preferably the intermediate structure contains a horizontal flange that covers the pocket hole and extends beyond the pocket hole to protect the opening of the pocket hole. Preferably the legs are long enough to keep this flange from contacting the vehicle body. Preferably the legs are affixed to the intermediate structure in a manner that the legs can be moved transversely with respect to the pocket hole so as to force the legs or shims against the walls of the pocket insert. The pocket insert further comprises an extender disposed between the legs adapted to push the legs and shims against the walls of the pocket hole. Any extender system that performs this function may be used for instance a mechanical system such as opposing wedges as described hereinafter, injectable high density foam, springs, scissor structures, and the like. Preferably the intermediate structure has an expansion adjuster for the expander on the support receiver side such that a user can adjust the expansion of the expander. Preferably the expansion can be increased for mounting and decreased for removing the rack. The expansion adjuster passes through the intermediate structure and is in contact with the mechanical system that allows it to expand. The adjuster can be a spring, a bolt with threads, of any other mechanism that can translate movement to expand the expander. In a preferred embodiment of the pocket hole insert a mounting bolt extends downward through the support rail and into the pocket hole insert, where a first wedge is attached to the base of the support rail by any means known in the art, for example welding. The mounting bolt proceeds to run through the first wedge where it passes through a second wedge. Upon the tightening of the mounting bolt the second wedge moves from its position below the first wedge to a position along the second wedge. In some embodiments of the invention shims are placed on either side of the wedges beginning at the top of the pocket hole insert down through past the wedges. The wedges may be fabricated from any materials which allow them to perform their function for example engineered polymers (polycarbonate (PC), nylon, ABB (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the wedges. When the rack is secured into the pocket holes of a truck two or more shims are placed into the pocket hole prior to the pocket hole insert to prevent the base of the support rail rim, or the horizontal rail from resting on the pocket hole lip of the pocket hole. When shims are used in the pockets of a truck they are placed into the truck and run from the base of the pocket hole to the bottom of the rim base. Shims may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the shims. Shims may come in various sizes and shapes to accommodate the inside of a pocket hole or other securing means in order to provide the most secure fit of the invention. In some embodiments of the invention to insure a secure fit one or more spacers are placed into the pocket holes of a truck prior to the insertion of the shims. Spacers may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Alternatively the shims may be prepared from an elastomeric material that may be compressed for use and which facilitates forming an interference fit. Examples include, polyurethans, EPDM, elastomer modified polyolefins and the like. Any of the materials useful for the horizontal rails may be utilized for the spacers. Preferably the spacers are fabricated from a material having a deflection ability of 70 duro or greater, more preferably 80 duro or greater and up 100 duro. Shims may come in various sizes and shapes to accommodate the inside of a pocket hole or other securing means in order to provide the most secure fit of the invention.

Figures 1, 2:
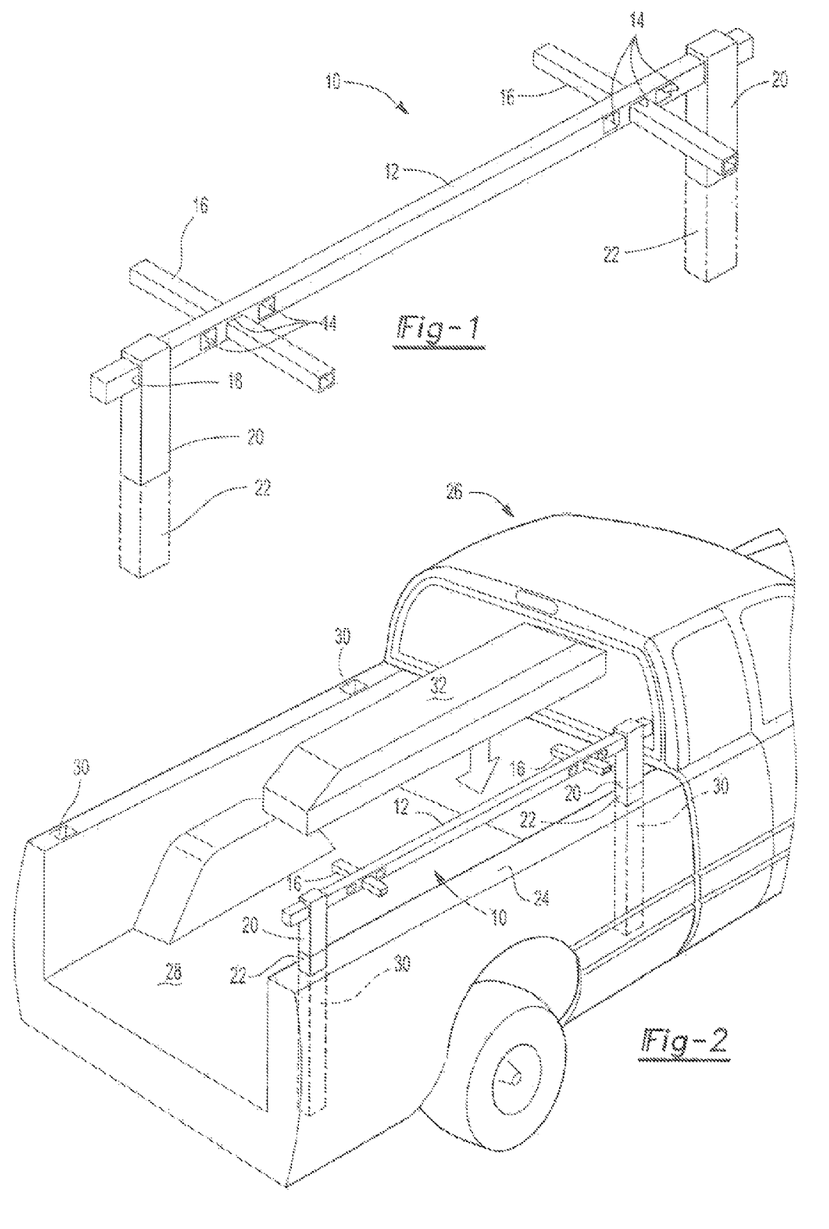
FIG. 1 is one embodiment of the rack of the invention.
FIG. 2 shows mounting a utility carrier on a pickup truck using the embodiment of FIG. 1.

A basic embodiment of the rack 10 of the invention is illustration of FIG. 1. In this particular embodiment the horizontal rack 12 contains perpendicular holes 14 that run from one side of the horizontal rail 12 to the other allowing the carrying rails 16 to be placed within. The perpendicular holes 14 also allow the carrying rails 16 to be placed in different perpendicular holes 14 as needed and to adjusted side to side. Either end of the horizontal rails 12 may slide through an upper hole 18 of each support rail 20 allowing for the adjustment of the length between the two support rails 20. The two support rails 20 then sit on pocket hole inserts 22.

The basic rack 10 embodiment of FIG. 1 is shown in FIG. 2 being mounted to a side wall 24 of a truck 26 with an open back side or bed 28. More specifically the pocket hole inserts 22 of the basic rack 10 are inserted into the pocket holes 30 which are along a side wall 24 of the truck 26. A utility carrier 32 can then be mounted on to the carrying rails 16 once they are secured in the horizontal rail 12 and the rack 10 is secured in the pocket holes 30 of the truck 26.

Figures 3, 4:
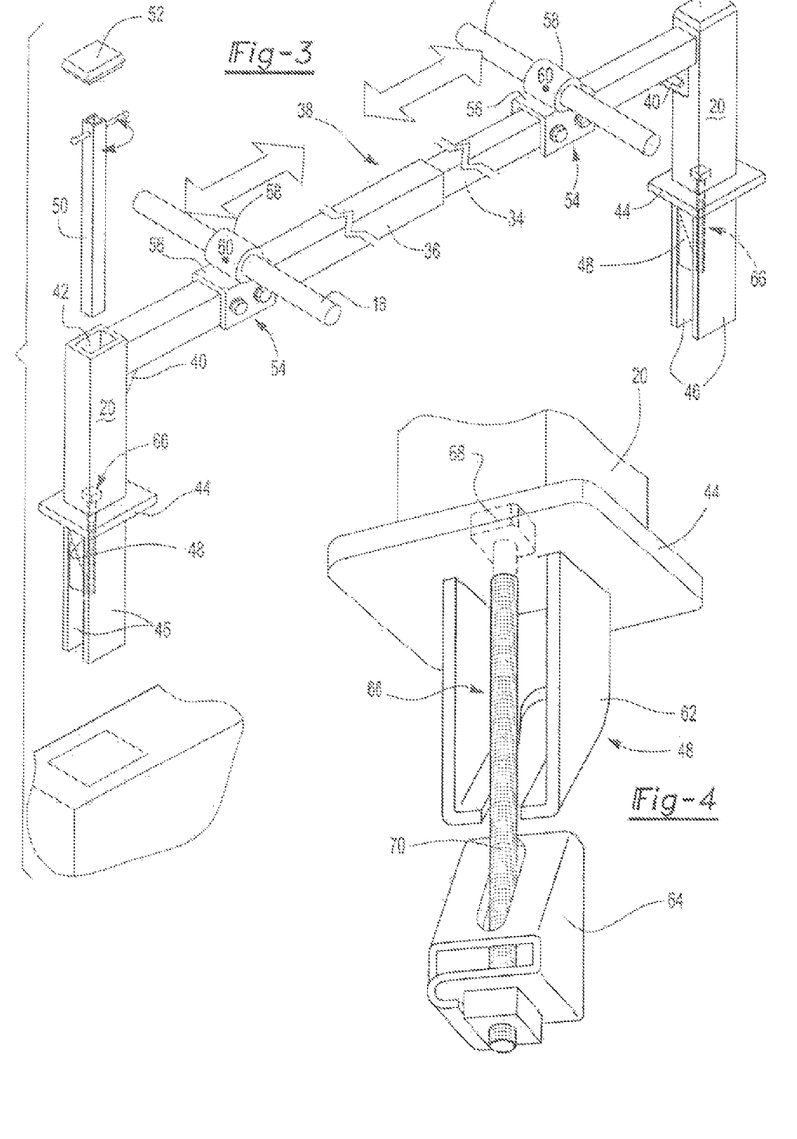
FIG. 3 is another embodiment of the invention.
FIG. 4 is a pocket insert.

Another embodiment of the invention is illustrated in FIG. 3. In this embodiment a smaller diameter horizontal rail 34 is nested inside of a larger diameter horizontal rail 36 to create a telescoping horizontal rail 38 is used. The telescoping horizontal rails allow the support rails 20 to move closer together and farther apart in this embodiment. The support rails 20 and the telescoping horizontal rail 38 may form a 90 degree angle wherein a triangle tie down 40 is between the two supports. The triangle tie down may be made of any other material that is useful for the creation of the triangle tie down 40 which allow it to perform its function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails 38 may be utilized for the triangle tie downs 40, but it does not have to be the same material used. The support rails 20 in this embodiment are hollow tubes 42, which end at a rim base 44 where the pocket hole insert 22 begins. The pocket hole inserts 22 each having two shims 40 and a wedge system 48. The wedge system 48 is activated when a mounting bolt 66 is tightened when the mounting bolt head 68 having a unique shape is turned by a vertical tube 50, which fits the mounting bolt head 68. Once the rack is secured to a vehicle a cap 52 is placed on to the support rails 20. The telescoping rail 38 has at least one mounting bracket 54 on each half of the rail. The mounting bracket 54 has a bracket 56 with at least one tube receiver 58 that is secured perpendicularly on top of the bracket 56. A carrying rail 16 is inserted into the tube receiver 58 where it can then receive cargo such as a utility carrier 32. The carrying rail 16 may or may not be secured within the tube receiver with a securing mechanism 60, such as a bolt, screw, lock, snap, or any other means known in the art.

Figures 5, 6:
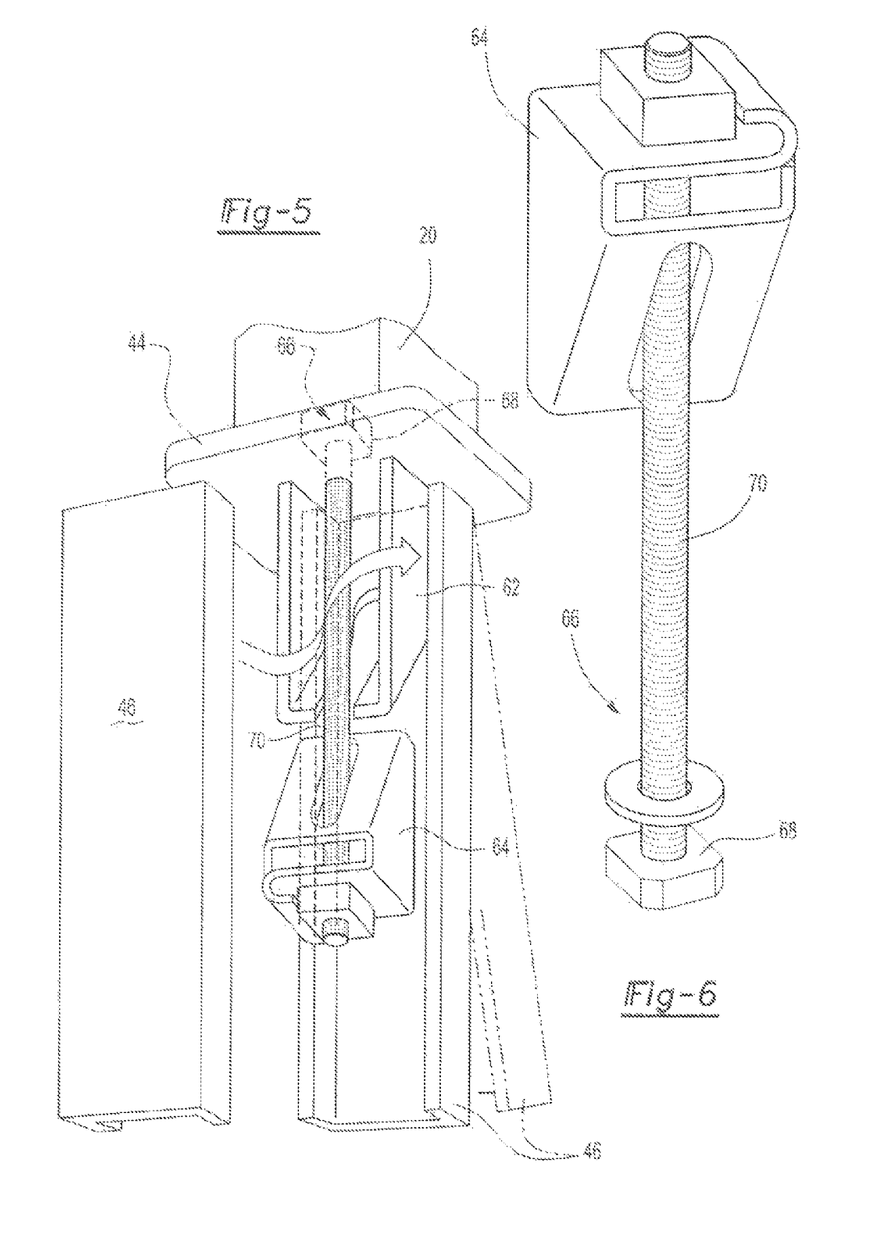
FIG. 5 is another view of a pocket insert of the invention.
FIG. 6 is a mounting bolt body.

The pocket insert is illustrated in FIGS. 4 and 5. The pocket hole insert 22 that rests below the rim base 44 of the support rail 20 is shown in greater detail. As illustrated in FIG. 4 the wedge system 48 is made up of an upper wedge 62, lower wedge 64 and mounting bolt 66. On the other side of the rim base 44 is the mounting bolt head 68 as illustrated in FIG. 5. When the mounting bolt head 68 is tightened the lower wedge 64 raises up into the upper wedge 62, forming a secure fit with the shims 46 in a pocket hole. The mounting bolt body 70 that runs through the wedge system 48 is illustrated in FIG. 6, as it is attached to the lower wedge 64.

Figures 7, 8:
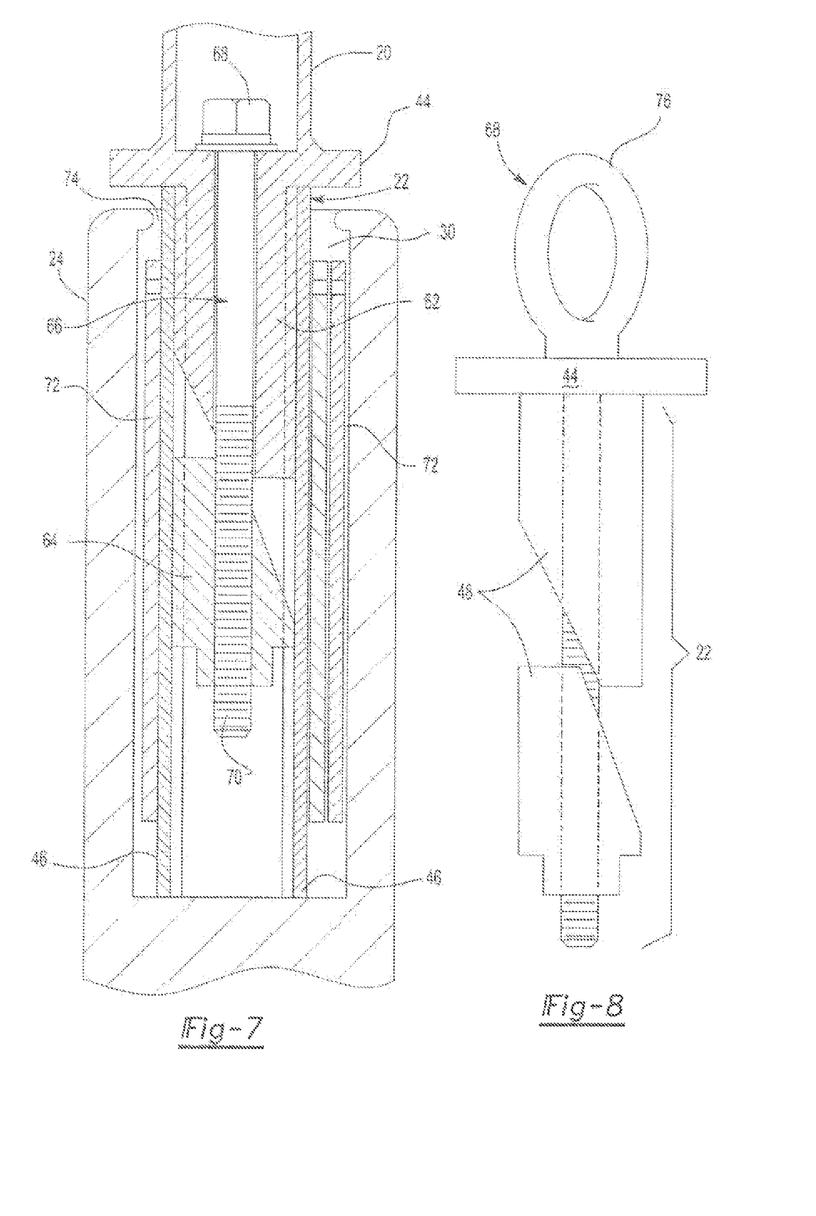
FIG. 7 is a cross sectional view of an embodiment of the pocket insert within a pocket hole of a truck.
FIG. 8 is a pocket insert having a circular top which can be used to secure object within the bed or to the rack.

A cross sectional view of the various elements of a pocket hole insert within a pocket hole 30 of a truck 26 are illustrated in FIG. 7. One or more spacers 72 are placed into the pocket hole 30 of a truck 26 followed by the shims 46 which are placed so that they run parallel with the side wall 24 of the truck 26. The shims 46 are also placed so that they extend to the bottom of the pocket hole and extend slightly above the pocket hole lip 74 of the truck 26, allowing the rim base 44 of the support rail 20 to sit above the pocket hole lip 74.

Another embodiment of a pocket hole insert 22 having a wedge system 48 is illustrated in FIG. 8. In this embodiment a mounting bolt head 68 with a circular top 76 is shown to be above the rim base 44. The circular top can be used to secure objects to the rack or within the bed of the truck. One or more pocket hole inserts with a circular top may be placed in one or more pocket holes of a vehicle to be used as a tie down system without the rack.

In additional embodiments of this invention two or more racks may be placed on a truck at a time. The racks may be placed one on each side of the truck, multiple racks on both sides, or a combination thereof. When at least one rack is placed on each side of the vehicle the two may be connected across the bed. In another embodiment of the invention cargo of different varieties may be attached to the same rack or multiple racks on the same side.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. An article comprising:
    a horizontal rail wherein a smaller tube nests within a larger tube creating a telescoping rail, wherein one or more support rails are attached perpendicularly to the smaller tube, one or more support rails are attached perpendicularly to the larger tube, one or more rail mounting brackets are attached in parallel on an upper side of the smaller tube, one or more rail mounting brackets are attached in parallel on the upper side of the larger tube;
    the support rails have a hollow post extending downward from the horizontal rail, into a pocket hole insert, wherein a mounting bolt head rests on a base of the hollow post while a mounting bolt body extends through a hole in a rim base of the hollow post continuing through the pocket hole insert;
    the rail mounting brackets have a bracket, with one or more tube receivers secured perpendicularly on top of the bracket, a carrying rail is disposed in the tube receiver;
    wherein the article is adapted to be secured to a side of a vehicle with open rear sides to secure one or more objects in line with the side of the vehicle with open rear sides.

2. The article of claim 1 wherein the pocket hole insert is placed into a pocket hole of the vehicle with open rear sides.

3. The article of claim 1 wherein the pocket hole insert has a wedge assembly, with a shim running along two opposing sides of the wedge assembly beginning at the rim base of the hollow post to below the wedge assembly.

4. The article of claim 3 wherein the shims is placed into the pocket hole of the vehicle prior to the insertion of the wedge assembly to prevent the rim base from making contact with a pocket hole lip.

5. The article of claim 3 wherein the shims are placed into the pocket hole of the vehicle prior to the insertion of the wedge assembly.

6. The article of claim 5 wherein the shims prevent the rim base from making contact with a pocket hole lip.

7. The article of claim 6 wherein one or more spacers are placed into the pocket hole of the vehicle prior to the insertion of the shims.

8. The article of claim 6 wherein one or more spacers are placed into the pocket hole of the vehicle prior to the insertion of the shims.

9. The article of claim 3 wherein the wedge assembly has two or more opposing wedges, an upper wedge is welded to the rim base of the hollow post while a lower wedge is secured on the mounting bolt body.

10. The article of claim 9 wherein the lower wedge engages the upper wedge when the mounting bolt is tightened.

11. The article of claim 10 wherein the mounting bolt is tightened with a vertical tube matching a shape corresponding to that of the mounting bolt head.

12. The article of claim 11 wherein the pocket hole insert has a wedge assembly, with a shim running along two opposing sides of the wedge assembly beginning at the rim base of the hollow post to below the wedge assembly.

13. The article of claim 12 wherein the pocket hole insert is placed into a pocket hole of the vehicle with open rear sides.

14. The article of claim 13 wherein the shims is placed into the pocket hole of the vehicle prior to the insertion of the wedge assembly.

15. The article of claim 14 wherein the shims prevent the rim base from making contact with a pocket hole lip.

16. The article of claim 15 wherein one or more spacers are placed into the pocket hole of the vehicle prior to the insertion of the shims.

17. An article comprising:
    a mounting rail system wherein a smaller tube nesting within a larger tube creating a telescoping rail, wherein one or more posts are attached perpendicularly to the smaller tube, one or more posts are attached perpendicularly to the larger tube, one or more rail mounting brackets are attached in parallel on an upper side of the smaller tube, one or more rail mounting brackets are attached in parallel on the upper side of the larger tube;
    the posts have a hallow post extending downward from the telescoping rail, with a mounting bolt running through it into a pocket hole insert, wherein a mounting bolt head rests on a base of the hollow post white a mounting bolt body extends through a hole in a rim base of the hollow post continuing through the pocket hole insert wherein the pocket hole insert has a wedge assembly, with a shim running along two opposing sides of the wedge assembly beginning at the rim base of the hollow post to below the wedge assembly;
    the rail mounting brackets have a bracket, with one or more tube receiver secured perpendicularly on top of the bracket, a mounting tube is then placed into the tube receiver;
    the mounting rail system is secured to a side of a vehicle with open rear sides to secure one or more cargo containers and/or sports equipment racks in line with the side of the vehicle with open rear sides.

18. The article of claim 17 wherein the pocket hole insert is placed into a pocket hole of the vehicle with open rear sides.

19. The article of claim 17 wherein the wedge assembly has two or more opposing wedges, an upper wedge is welded to the rim base of the hollow post while a lower wedge is secured on the mounting bolt body.

20. The article of claim 19 wherein the lower wedge engages the upper wedge when the mounting bolt is tightened with a vertical tube matching a shape corresponding to that of the mounting bolt head.

* * * * *